Figure 1:
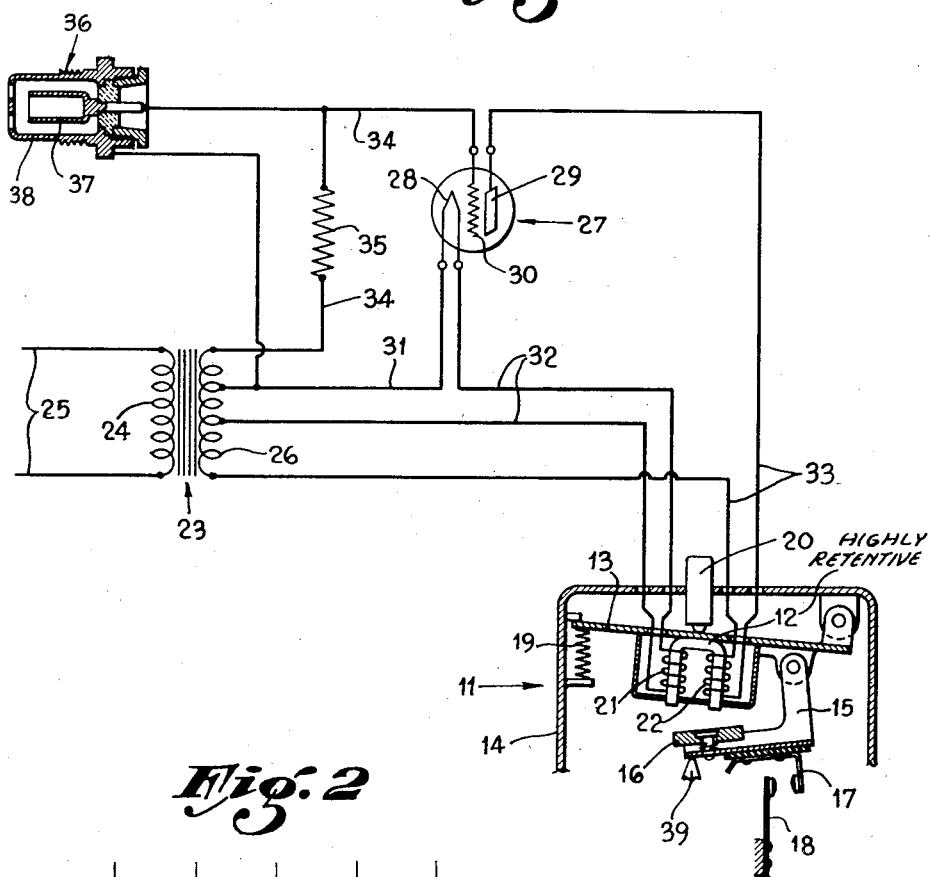

Aug. 10, 1948.    W. A. RAY    2,446,719
ELECTRIC CIRCUIT FOR ELECTROMAGNETS
Filed Jan. 19, 1946

Inventor:
WILLIAM A. RAY,
By
John H. Rouse,
Attorney.

Patented Aug. 10, 1948

2,446,719

UNITED STATES PATENT OFFICE 2,446,719

ELECTRIC CIRCUIT FOR ELECTROMAGNETS

William A. Ray, North Hollywood, Calif., assignor to General Controls Co., Glendale, Calif., a corporation of California Application January 19, 1946, Serial No. 642,409

6 Claims. (Cl. 175—335)

This invention relates to electrical control systems, and more particularly to one which includes an electromagnet of the holding type.

When an electromagnet is to be energized by means of the alternating current commonly available from commercial electric-service sources, in order to obtain relatively steady magnetic flux in the magnet means may be provided for rectifying one or both halves of the alternating-current cycle so as to produce half-wave or full-wave pulses of direct current. Since half-wave rectification can be accomplished by the use of a simple rectifier, such as an ordinary electron-discharge tube which may also serve as an amplifier of the control energy, it is customary to employ such half-wave rectification; however, it is then necessary to smooth-out the direct-current pulses by means of a filter comprising a relatively-large capacitance. Under conditions of full-wave rectification of one alternating energy, the requirement for a smoothing filter is usually avoided; however, heretofore that advantage has been offset by the requirement for a more-complicated full-wave rectifier. It is therefore an object of this invention to provide a system whereby substantially uniform unidirectional magnetic flux can be produced by the employment of a simple half-wave rectifier, and without the requirement for a smoothing filter. This object is accomplished by producing alternating magnetic flux and, simultaneously, pulses of unidirectional flux which oppose said alternating flux during alternate half-wave alternations thereof; the flux pulses being so much greater than the flux alternations which they oppose that the resultant flux is in the same direction and substantially uniform in magnitude during each half-wave period.

In my copending application Serial No. 516,733, filed January 1, 1944, there is disclosed a control system energized by alternating current from the service lines and including an electromagnetic device of the "manual-reset" type. This device is arranged to "drop-out" upon the establishment of an abnormal or unsafe controlling condition and thereby render the system inoperative; it then being necessary to manually-reset the device (after the cause of the unsafe condition has been eliminated) to reinitiate normal operation of the system. One of the features of the invention of said copending application lies in the provision of means whereby the device "holds-in" in the event of interruption of the electric service—instead of dropping-out and requiring resetting, as is the case in previous control systems of this character. The manner in which this feature is accomplished is as follows: a rectified component of the alternating current is supplied, under the control of a condition-responsive switching device, to the coil of the electromagnet to effect magnetic holding of an armature. The core (and/or the armature) of the electromagnet is constructed of ferrous material having considerable magnetic remanence so that interruption of the supply of alternating current does not in itself effect drop-out of the armature; this purpose being accomplished by subjecting the core to a weak alternating flux (produced by current from the service lines) which so demagnetizes the core, when the rectified current is interrupted, that the armature is released. Inasmuch as both the alternating current and the rectified current are simultaneously interrupted when a "power failure" occurs, the armature is then held-in. It is another object of the present invention to provide an improved control system wherein the feature just described is combined with the feature set forth in the preceding paragraph.

For full understanding of the invention, and further appreciation of its objects and advantages, reference is to be had to the following detailed description and accompanying drawing, and to the appended claims.

Figure 2:
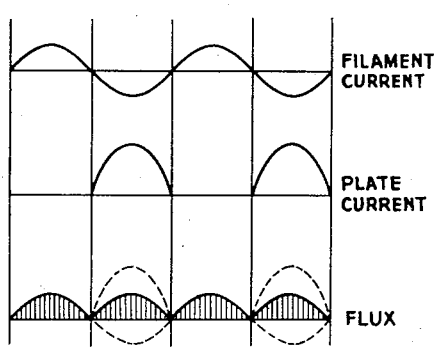

In the drawing:

Figure 1 is a generally diagrammatic view of a control system embodying the invention; and Figure 2 is a graph showing the general relation of the energizing currents and resultant flux in the electromagnet of Fig. 1.

In the drawing, the numeral 11 generally indicates an electromagnetic control device, of the manual-reset type, comprising a U-shaped magnet core 12 which is fixedly mounted on a lever 13 pivoted at one end on the top wall of a housing 14. Pivotally connected to the lever 13 is a right-angled arm 15 which carries an armature 16, cooperable with the core 12, and contact blade 17 cooperable with a fixed contact blade 18. The lever 13 is biased in a clockwise direction by a compression spring 19 and is movable in the opposite direction by means of a push-button 20 which projects through an opening in the top wall of the housing 14. Around the individual side-arms of the core is a pair of coils 21 and 22.

Indicated at 23 is a transformer having a primary 24, connected to alternating-current service lines 25, and a secondary 26 which is tapped to provide energy at potentials suitable for the operation of an electron-discharge tube 27. The tube illustrated, by way of example, is of the simple triode type and comprises a direct-heated cathode or heater 28, an anode 29, and a control grid 30. The two terminals of the heater 28 are connected to the transformer, respectively, by a wire 31, and by another wire 32 in which the coil 21 is inserted. The anode is connected by a wire 33, in series with the coil 22, to the lower end of the transformer; the opposite end of the transformer being connected by a wire 34, in series with a resistor 35, to the control grid 30.

At 36 there is indicated a control device comprising a pair of mutually-insulated electrodes 37 and 38 which are connected, respectively, to the control grid and to the wire 31. The device 36, shown by way of example, is of the type adapted to be mounted, by means of its threaded electrode 38, in an opening through the wall of a boiler. Due to the high electrical conductivity of ordinary water, the circuit of the device 36 is effectively closed when the water level is above the electrodes and open when the water drops below them. While the circuit of device 36 is open, the control grid is negative with respect to the cathode at that part of the alternating-current cycle when the anode is positive with respect to the cathode, so that the conductivity of the tube is then effectively stopped; when the circuit of device 36 is closed, the control grid is at zero potential with respect to the cathode when the anode is positive (it being assumed that the effective resistance of device 36 is very low with respect to that of resistor 35) so that the tube is then conductive.

When the tube 27 is in non-conducting condition, the electromagnetic device 11 is energized only by alternating current flowing through coil 21 in series with the heater 28; this current being represented by the "Filament current" curve in the graph of Fig. 2. When the tube is in conducting condition, half-wave pulses of rectified current flow in the anode circuit through coil 22 which is so polarized that the pulses oppose the simultaneous alternations in coil 21; these pulses being represented as "Plate current" in the graph. The circuit components of the system are so arranged that the magnitude of the rectified pulses is approximately twice that of the alternations which they oppose, so that the resultant flux in the core is substantially uniform and in the same direction during each half-wave period when the tube is in conducting condition, as is generally indicated by the shaded "Flux" areas at the bottom of the graph; it being understood that no attempt has been made to show the actual shape of the flux curve.

In describing the operation of the system it will be assumed that the contact blades 17—18 are in a circuit for controlling the operation of a furnace for heating a boiler wherein the control device 36 is mounted, and that operation of the furnace is checked when the contact blades are separated. With the electromagnetic device 11 in the condition shown in the drawing, the push-button 20 is manually depressed to rock the lever 13 and thereby bring the pole-faces of the core 12 into engagement with the armature; a stop 39, upon which the arm 15 normally rests by gravity, preventing recession of the armature. Upon release of the push-button, the core 12 is returned to its raised position under the force of spring 19 and, assuming that the water-level in the boiler is above the control device 36 so that the tube 27 is in conducting condition, and the armature therefore magnetically held by the full-wave flux produced in the core, the arm 15 is raised simultaneously therewith so that engagement of the contact blades 17—18 and resultant operation of the furnace is effected. It will be observed that the lever 13 and arm 15 are so arranged with respect to each other that, if conditions are such that the armature is not magnetically held by the core, the furnace-control circuit cannot be closed by operation of the push-button.

If, due to a "power failure" or interruption of supply of alternating current to the service lines 25, current flow through both the coils 21 and 22 is simultaneously stopped, the armature is retained in attracted positon against the gravity-bias of arm 15 due to the fact that, according to this invention, the core and/or the armature is constructed of material the magnetic remanence of which is relatively great. In order for the armature to be released it is therefore necessary to effect demagnetization of the magnetic part or parts, and that occurs when in normal operation of the system the boiler-water falls below the control device 36 so that the tube 27 ceases to conduct and the core and armature are subjected only to the flux produced by the alternating current flowing in the circuit of coil 21; the components of that circuit being such that suitable demagnetizing force is then produced by the alternating current.

A safety feature of this invention resides in the arrangement of the coil 21 in series with the heater 28. If the coil 21 becomes defective the system is rendered inoperative since the heater 28 is deenergized if the coil opens, and is burnt-out due to increased voltage across it if the coil is shorted.

The embodiment of my invention herein shown and described is obviously susceptible of modification without departing from the spirit of the invention, and I intend therefore to be limited only by the scope of the appended claims.

I claim as my invention:

1. The method of energizing an electromagnet which consists of: producing alternating magnetic flux in the core of said electromagnet; simultaneously producing in said core, only during each alternate half-wave alternation of said alternating flux, a pulse of unidirectional flux which opposes the alternating flux produced during said half-wave alternation; and making said pulses so much greater than the flux alternations which they oppose that the resultant flux produced in the core is in the same direction and substantially uniform in magnitude during each half-wave period.

2. In a system for energizing an electromagnet comprising a core: a pair of coils in flux-inducing relation to said core; an electron-discharge tube having a cathode, including a heater therefor, and an anode; a first circuit including, in series, said heater, one of said coils and a source of alternating electrical energy; and a second circuit extending from said anode to said cathode and including, in series, the other of said coils and said source; said coils being so polarized that the pulses of rectified current produced in said second circuit oppose the alternating current flowing in said first circuit during alternate half-wave alternations thereof, said pulses being so much greater than the alternations which they oppose that the resultant magnetic flux produced in said core is in the same direction and substantially uniform in magnitude during each half-wave period.

3. In an electrical control system: an electromagnet comprising a core; a pair of coils in flux-inducing relation to said core; an electron-discharge tube having a cathode, including a heater therefor, and an anode; a first circuit including, in series, said heater, one of said coils and a source of alternating electrical energy; a second circuit extending from said anode to said cathode and including, in series, the other of said coils and said source; said coils being so polarized that the pulses of rectified current produced in said second circuit oppose the alternating current flowing in said first circuit during alternate half-wave alternations thereof, said pulses being so much greater than the alternations which they oppose that the resultant magnetic flux produced in said core is in the same direction and substantially uniform in magnitude during each half-wave period; and means for controlling flow of current in said second-circuit coil so that upon its cessation said core is influenced only by the alternating current flowing in said first-circuit coil.

4. In an electrical control system: an electromagnet comprising a core member; means for producing alternating magnetic flux in said core member; means for simultaneously producing in said core member pulses of unidirectional magnetic flux which oppose said alternating flux during alternate half-wave alternations thereof, said pulses being of the same frequency as that of said half-wave alternations, said pulses being so much greater than the flux alternations which they oppose that the resultant flux produced in the core member is in the same direction and substantially uniform in magnitude during each half-wave period; an armature member movable in directions into and out-of engagement with said core member and biased in the last-named direction; said electromagnet being so designed that it is capable of retaining said armature member in engaged relation to the core member when the members are first mechanically brought into interengagement and while said resultant flux exists in the core member, but is incapable of attracting the armature member through space; at least one of said members being constructed of material the remanence of which, in relation to said bias, is such that the armature member is retained in engagement with the core member upon cessation of all production of flux in the core member; and means for interrupting the production of said flux pulses, while maintaining production of said alternating flux, so that release of the armature member is effected due to the demagnetizing effect of said alternating flux upon the members.

5. In an electrical control system: an electromagnet comprising a core member; a pair of coils in flux-inducing relation to said core member; an electron-discharge tube having a cathode, including a heater therefor, and an anode; a first circuit including, in series, said heater, one of said coils and a source of alternating electrical energy; a second circuit extending from said anode to said cathode and including, in series, the other of said coils and said source; said coils being so polarized that the pulses of rectified current produced in said second circuit oppose the alternating current flowing in said first circuit during alternate half-wave alternations thereof, said pulses being so much greater than the alternations which they oppose that the resultant magnetic flux produced in said core member is in the same direction and substantially uniform in magnitude during each half-wave period; an armature member movable in directions into and out-of engagement with said core member and biased in the last-named direction; said electromagnet being so designed that it is capable of retaining said armature member in engaged relation to the core member when the members are first mechanically brought into interengagement and while said resultant flux exists in the core member, but is incapable of attracting the armature member through space; at least one of said members being constructed of material the remanence of which, in relation to said bias, is such that the armature member is retained in engagement with the core member upon failure of said source; and means for controlling flow of current in said second-circuit coil so that upon its cessation the core member is influenced only by the alternating current flowing in said first-circuit coil and release of the armature member is effected due to the demagnetizing effect of the alternating current on the members.

6. A system, as defined in claim 5, wherein additional means are provided in said electron tube for controlling the conductivity thereof and thereby the current flow in said second-circuit coil.

WILLIAM A. RAY.

REFERENCES CITED

The following references are of record in the file of this patent:

UNITED STATES PATENTS

| Number | Name | Date |
|---|---|---|
| 1,661,651 | Bossart | Mar. 6, 1928 |
| 2,260,810 | Jones | Oct. 28, 1941 |
| 2,360,954 | Logan | Oct. 24, 1944 |
| 2,404,982 | Owens | July 30, 1946 |